United States Patent
Morgenstern et al.

(10) Patent No.: US 6,614,756 B1
(45) Date of Patent: Sep. 2, 2003

(54) METHOD OF DETECTING AND RECOVERING FROM SIGNALING CONGESTION IN AN ASYNCHRONOUS TRANSFER MODE NETWORK

(75) Inventors: Meir Morgenstern, Or Yehuda (IL); David Margulis, Haifa (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/379,141

(22) Filed: Aug. 20, 1999

(51) Int. Cl.[7] .............................................. H04L 12/26
(52) U.S. Cl. .................................. 370/230; 370/395.41
(58) Field of Search ................................. 370/229, 230, 370/230.1, 231, 235, 236, 238, 238.1, 395.1, 395.2, 395.21, 412, 413, 414, 416, 417, 418, 395.4, 395.41, 395.42, 395.43

(56) References Cited

U.S. PATENT DOCUMENTS

| | | | | |
|---|---|---|---|---|
| 5,541,912 A | * | 7/1996 | Choudhury et al. | 340/825.5 |
| 5,541,987 A | * | 7/1996 | Topper et al. | 370/236 |
| 6,018,515 A | * | 1/2000 | Sorber | 370/229 |
| 6,212,164 B1 | * | 4/2001 | Murakami et al. | 370/230 |

* cited by examiner

*Primary Examiner*—Kwang Bin Yao
(74) *Attorney, Agent, or Firm*—Howard Zaretsky; Paul J. Sutton

(57) ABSTRACT

A method of detecting a signaling congestion situation in a transmitter within a communications switch and for handling and recovering from the congestion. The method functions to (1) monitor the level of the transmit queue for each output port and (2) to monitor the level of the signaling message buffer memory pool for all ports. When the levels of either pass predetermined thresholds, the signaling congestion state is declared. Once the signaling congestion state is declared, the call control or equivalent entity in the communications device stops routing new calls from/towards all ports that are in the signaling congestion state. The call control continues to handle existing calls from/towards ports that are in the signaling congestion state.

22 Claims, 4 Drawing Sheets

METHOD OF DETECTING AND RECOVERING FROM SIGNALING CONGESTION IN AN ASYNCHRONOUS TRANSFER MODE NETWORK

FIELD OF THE INVENTION

The present invention relates generally to data communications networks and more particularly relates to a method for detecting and recovering from signaling congestion in a connection oriented network such as an Asynchronous Transfer Mode (ATM) network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

SVC Connection Establishment

Networks that are connection oriented typically have two stages for connecting network users from point to point. The first stage in the establishment of the connection utilizes some form of signaling mechanism and in the second stage, data is transferred via the connection established in the first stage.

An example of such as connection oriented network is an ATM network. In the first stage, virtual connections are created using a complicated signaling/routing protocol such as Q.SAAL, Q.93, IISP, and/or PNNI between peer network nodes along the connection path to provide network users a service for establishing a connection to another network user. This connection is termed a Switched Virtual Connection (SVC) and, once created, is used as the data path between the users that have been connected.

The connection originator uses the signaling protocol to convey the service details it is requesting the network to provide, e.g., destination address (the called address), class of service (CoS), traffic descriptor, protocol which is to used by the virtual connection, network transit, etc. In addition, the originator provides information about itself, in particular, its own address (the calling address).

Once the network receives the request from the originator user, it attempts to find a route to the destination that has sufficient resources to fulfill the specific characteristic requirements of the request as provided by the originating user. If the network finds a satisfactory route with the necessary resources to establish the connection, and if the called user also has sufficient resources to establish the connection, the connection is then established. Once the route is established, data can flow between source and destination over the connection.

Such a network may carry another type of connection known as a Permnanent Virtual Circuit (PVC) which are typically established under manual management control. The service provided by PVCs and SVCs are the same, with the different being their method of establishment.

The signaling/routing protocol used typically consumes a high percentage of computation resources in a node. This makes the connection establishment process slow. PVCs, as an alternative to SVCs are set via management in a manual fashion on each network node along the path. The PVC connections are typically stored in the system memory within the nodes making up the connection and are recreated in the event one or more portions of the connection go down. The connections are recreated and restored automatically, quickly and without the overhead of the signaling and routing protocol.

In the course of network operations, SVCs may be constantly created and torn down. SVC connections may be created very quickly and last for a relatively short lifetime duration, i.e., on the order of hundreds of milliseconds, seconds, etc., before being removed. In many networks today SVCs serve to connect well known services located in the network to well known clients also connected to the network. These connections are utilized as permanent connections, as they are established and may not be taken down for days, weeks, or months. In many cases, SVCs are established on a permanent basis, whereby they are never taken down and remain up until the occurrence of a network failure.

Call Control

A block diagram illustrating an example ATM network comprising a plurality of switches serving to connect a source and destination end station is shown in FIG. 1. The example network, generally referenced 10, comprises an ATM network 24 consisting of end stations 12 labeled end station A and B, edge devices 14 labeled edge device A and B and a plurality of ATM switches 16 labeled ATM switch #1 through #5.

As described previously, in ATM networks, signaling is used as the main method of creating and terminating VCC connections. The connections created are used as the infrastructure to applications located at the higher layers. Examples of higher layer applications include LANE, MPOA, etc.

A block diagram illustrating a call control software/hardware application within an ATM switch and the plurality of signaling entities established and operative under its control is shown in FIG. 2.

With reference to FIGS. 1 and 2, the call control model shown, generally referenced 30, is used for signaling in ATM switches wherein each switch comprises N ports (input and output). The call control entity 32 is shown communicating with a plurality of signaling entities 34 labeled signaling entity #1 through signaling entity #N. Each signaling entity 34 functions to establish, terminate and maintain SVCCs using standards based interface signaling specifications such as UNI v3.0 or 4.0, PNNI signaling, etc.

The call control entity 32 functions to provide routing, bandwidth management and hardware programming services to the SVCCs. A key assumption made by the switch, however, is that the signaling is a reliable service. In other words, when a signaling Protocol Data Unit (PDU) is generated by the upper signaling application layer and passed to lower layers for transmission, it is assumed that the PDU was successfully transmitted to the destination via the network. The signaling entity represents a state machine at an upper layer, i.e., layer 3, which functions to create and terminate connections. A layer 2 application functions as a data link layer and provides services to the Layer 3 signaling above in a reliable manner.

In normal operation of the switch, the data link layer restricts the rate of transmission of signaling PDUs over each using a sliding or moving window transmission technique, a technique that is well known in the communication arts. The function of the sliding window transmission technique is to ensure that the transmitter does not overflow the receiver. Windowing involves limiting the number of packets/messages/PDUs that can be transmitted before an acknowledgement is received from the receiver. Receipt of acknowledgements cause the window to move or slide thus permitting additional messages to be transmitted.

In certain cases, however, large volumes of signaling traffic may be routed towards a particular egress link. This may happen, for example, when a network comprises hundreds of LECs which, upon powerup of the network, all attempt to connect at the same time to the LECS. In such cases of high volumes of signaling traffic, a congestion state starts to develop wherein signaling messages (PDUs) that are outstanding, i.e., that have not been sent, begin to be held in internal transmitter queues.

If, however, the transmitter continues to remain in the congested state for a long period of time, the switch will eventually reach a starvation point whereby not enough buffers are available for signaling. In a typical switch, a large pool of memory is provided that is used by the controller to carry out the various tasks and functions of the switch. A portion of this memory pool is designated for use as buffers for signaling messages.

While in the congestion state, the transmitter cannot transmit messages and thus places them in signaling message buffers assigned from the memory pool allotted to signaling messages. If the transmitter remains in the congestion state, the supply of signaling buffers declines. Since the number of available signaling message buffers is always limited (regardless of how much memory the switch has), a point is eventually reached whereby no free signaling message buffers are available.

From this point on, the switch begins dropping signaling messages (PDUs) which results in severe problems, namely what is termed 'broken' calls. A broken call is a call that was not terminated properly in accordance with any standard, e.g., UNI, PNNI, etc., due to a loss of the RELEASE PDU message somewhere in the network. In most cases, this problem is not recoverable within the scope of signaling and typically causes severe problems for the higher layer applications. Thus, the dropping of signaling PDUs by the transmitter violates the assumption of reliable transmission that the upper layers in the hierarchy rely on.

What is needed, therefore, is a means within the switch for first detecting the existence of a congestion state and second for recovering and handling the congestion state situation.

SUMMARY OF THE INVENTION

The present invention is method of detecting a signaling congestion situation in a transmitter within a switch and for handling and recovering from the signaling congestion. The invention also comprises a method for detecting the absence of a signaling congestion situation and the processing thereof. The invention is applicable to ATM switching networks wherein a sliding window technique is used in transmitting signaling or any other type of messages from a source to a destination. The invention, however, is not limited to application only to ATM networks. It is applicable to any type of communications system whereby a siding window technique is used to transmit data from one point to another.

The method of the present invention functions to (1) monitor the level of the transmit queue for each port and (2) to monitor the level of the signaling message buffer memory pool. When either level passes predetermined thresholds, the signaling congestion state is declared. The thresholds used to determine whether a port is in the signaling congestion state are based on the size of the signaling sliding window and the number of ports within the communication device (e.g., switch).

Once the signaling congestion state is declared, the call control or equivalent entity in the communications device, e.g., the switch, stops routing new calls from/towards all ports that are in the signaling congestion state. The call control continues, however, to handle existing calls from/towards ports that are in the signaling congestion state.

Not only does the method of the present invention provide a solution to the broken call phenomena, but it also enables more efficient management of the signaling memory buffers which results in reduced memory consumption by the switch. Thus, switches employing the method of the present invention, for the same call connection throughput and load, require less memory for signaling message buffers than those switches not employing the method.

There is thus provided in accordance with the present invention, in a communication system network including a plurality of communication devices each having one or more transmitters and receivers, each transmitter having an output port and signaling transmitter queue associated therewith, the communication system also including a memory buffer pool shared by a plurality of output ports, a method of detecting on an output port basis the existence of and recovering from a congestion state, the method comprising the steps of monitoring the current length of the transmit queue, monitoring the current ratio of free buffer space available in the memory buffer pool, declaring an output port to be in the congestion state upon the length of the signaling transmit queue exceeding a first threshold or upon the ratio of available memory buffer pool space dropping below a second threshold and ceasing to route new calls from and towards an output port that is in a congestion state.

The method further comprises the step of continuing to handle already existing calls from and towards output port in a congestion state. The first threshold comprises an upper transmit queue threshold forming part of a hysteresis mechanism for preventing oscillation into and out of the congestion state. More particularly, the method according to claim 1, wherein the first threshold comprises an upper transmit queue threshold equal to (N−1)·window_size, wherein N is the number of ports on the communications device and window_size is the size of a sliding window mechanism used in transmitting data from the output port.

The second threshold comprises a lower memory buffer pool threshold forming part of a hysteresis mechanism for preventing oscillation into and out of the congestion state. For example, the second threshold may comprise a lower memory buffer pool threshold equal to 15%. The method further comprises the step of taking an output port out of the congestion state when the signaling transmit queue length drops below a third threshold and the ratio of available buffer space in the memory buffer pool exceeds a fourth threshold. The third threshold may comprise a lower transmit queue threshold forming part of a hysteresis mechanism for preventing oscillation into and out of the congestion state. More particularly, the third threshold comprises a lower transmit queue threshold equal to $$\left(\frac{N-1}{2}\right)\cdot \text{window\_size},$$

wherein N is the number of ports on the communications device and window_size is the size of a sliding window mechanism used in transmitting data from the output port. The fourth threshold comprises an upper memory buffer pool threshold forming part of a hysteresis mechanism for preventing oscillation into and out of the congestion state. For example, the fourth threshold comprises an upper memory buffer pool threshold equal to 25%.

The method further comprises the steps of attempting to route a new call to an output port not in the congestion state and rejecting a call which cannot be routed to an alternative output port not in the congestion state utilizing a unique RELEASE CAUSE operative to notify the rest of the network that the call was rejected due to a temporary congestion state on the output port.

There is further provided in accordance with the present invention, in a communication system including a plurality of communication devices each having one or more transmitters and receivers, each transmitter having an output port and signaling transmitter queue associated therewith, the communication system also including a memory buffer pool shared by a plurality of output ports, a method of taking an output port currently in the congestion state, out of the congestion state, the method comprising the steps of monitoring the current length of the signaling transmit queue, monitoring the current ratio of free buffer space available in the memory buffer pool, taking an output port out of the congestion state when the signaling transmit queue length drops below a first threshold and the ratio of available buffer space in the memory buffer pool exceeds a second threshold and resuming the routing of calls from and towards the output port upon its removal from the congestion state.

There is also provided in accordance with the present invention an apparatus for detecting and recovering from a congestion state for use in a communications device, the communications device coupled to a network, the apparatus comprising one or more transmitters each having an output port and a signaling transmit queue associated therewith, a memory buffer pool shared by a plurality of output ports, one or more signaling entities operative to establish, terminate and maintain one or more Switched Virtual Channel Connections (SVCCs), a call control entity for configuring, administering and controlling the one or more signaling entities, software means operative on the one or more signaling entities and the call control entity for: monitoring the current length of each signaling transmit queue, monitoring the current ratio of free buffer space available in the memory buffer pool, declaring an output port to be in the congestion state upon the length of the signaling transmit queue exceeding a first threshold or upon the ratio of available memory buffer pool space dropping below a second threshold and ceasing to route new calls from and towards an output port that is in a congestion state.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
|---|---|
| ANSI | American National Standards Institute |
| ATM | Asynchronous Transfer Mode |
| CCITT | Comite Consulatif International Telegraphique et Telephonique |
| CoS | Class of Service |
| FDDI | Fiber Distributed Data Interface |
| IISP | Interim Inter-Switch Signaling Protocol |
| ITU | International Telecommunications Union |
| LANE | LAN Emulation |
| LEC | LAN Emulation Client |
| LECS | LAN Emulation Configuration Server |

-continued

| Term | Definition |
| --- | --- |
| MPOA | Multiprotocol Over ATM |
| PDU | Protocol Data Unit |
| PNNI | Private Network to Network Interface |
| PVC | Permanent Virtual Circuit |
| SAAL | Signaling ATM Adaptation Layer |
| SVC | Switched Virtual Circuit |
| SVCC | Switched Virtual Channel Connection |
| UNI | User to Network Interface |
| VCC | Virtual Channel Connection |

General Description

The present invention is a method of detecting a signaling congestion situation in a transmitter within a switch and for handling and recovering from the congestion. The invention also comprises a method for detecting the clearing of the signaling congestion and removal of the port from the congestion state. The invention is applicable to ATM switching networks wherein a sliding window technique is used in transmitting signaling or any other type of messages from a source to a destination. The invention, however, is not limited to application only to ATM networks. It is also applicable to any type of communications system whereby a siding window technique is used to transmit data from one point to another.

The present invention detects the presence of a signaling congestion situation by continuously monitoring (1) the level of the transmit queue for each port and (2) the level of the signaling message buffer memory pool. When either level exceeds predetermined thresholds, the signaling congestion state is declared.

To aid in understanding the principles of the present invention, the method of the invention is presented in the context of an ATM switching communication system. Note, however, that the method is applicable to other types of communications systems as well.

Figure 1:
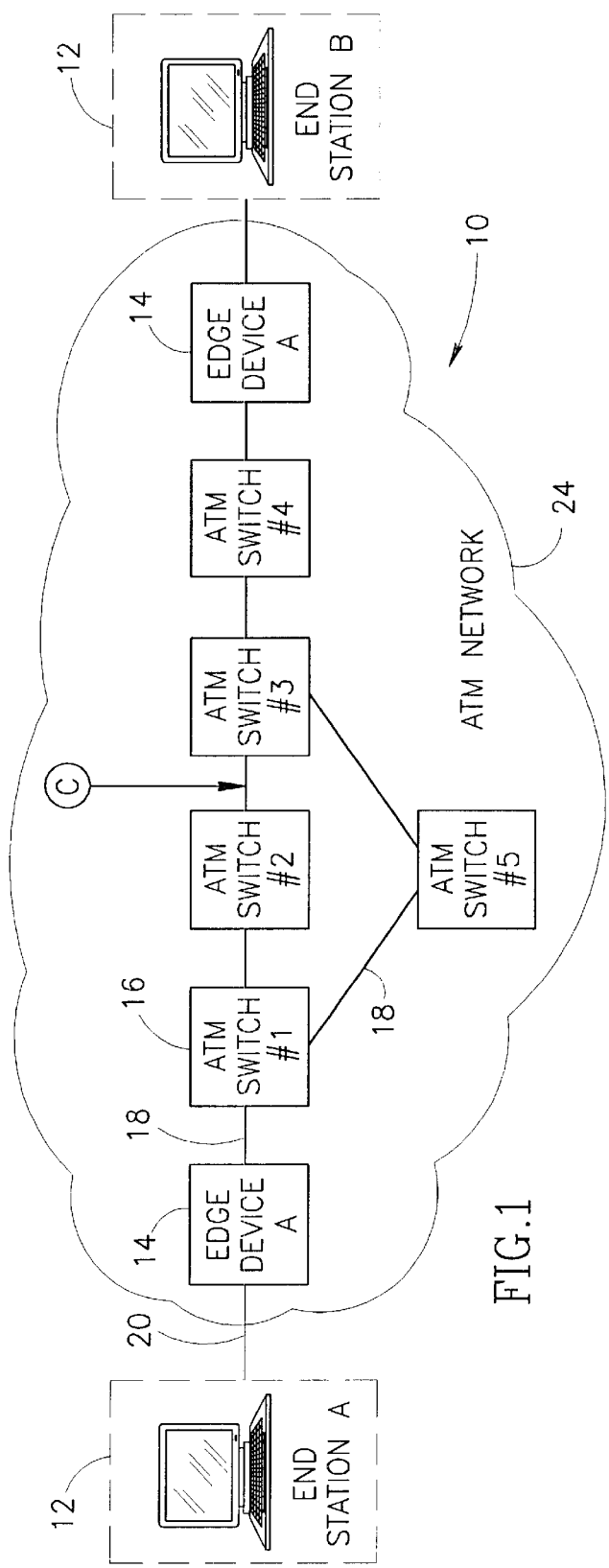
FIG. 1 is a block diagram illustrating an example ATM network comprising a plurality of switches serving to connect a source and destination end station.
Figure 2:
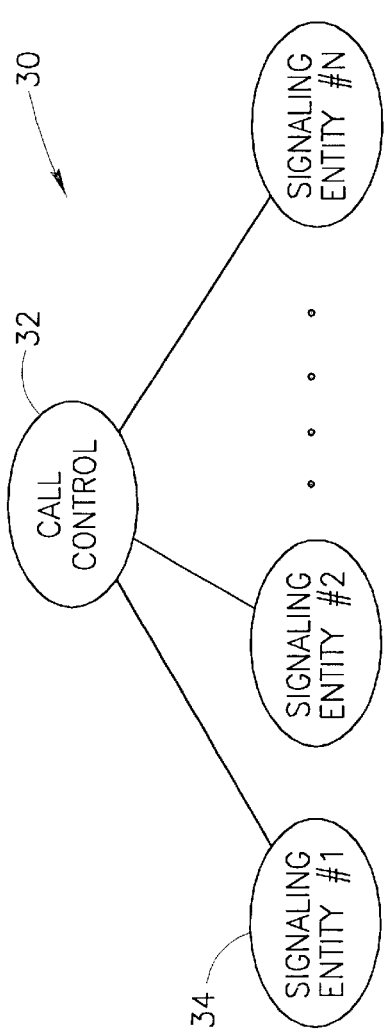
FIG. 2 is a block diagram illustrating call control software/hardware application within an ATM switch and the plurality of signaling entities established and operative under its control.
Figure 3:
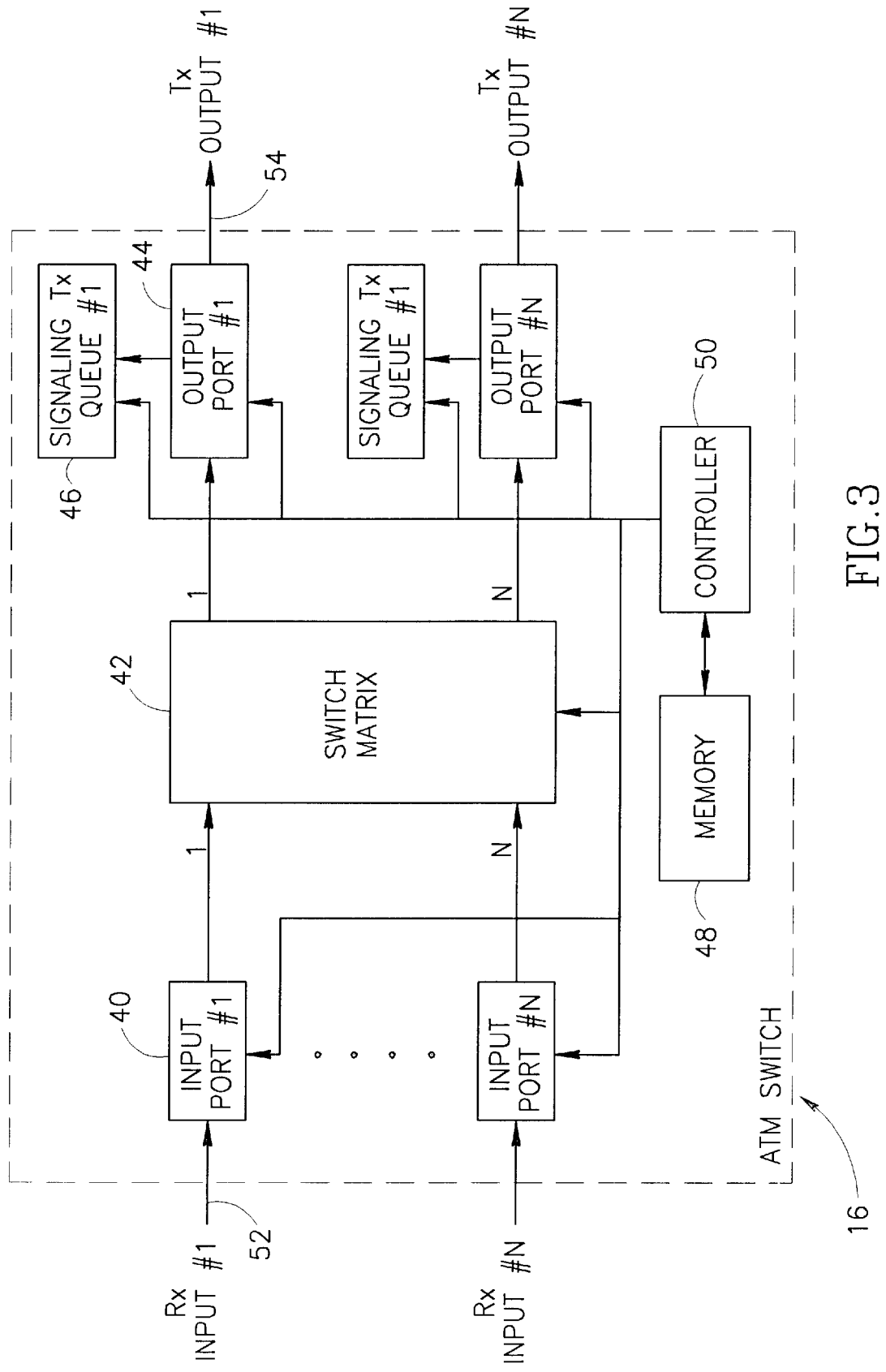
FIG. 3 is a block diagram illustrating an example ATM switch in more detail showing the Tx output queues and memory pool coupled to the controller.

A block diagram illustrating an example ATM switch in more detail showing the signaling Tx output queues and memory pool coupled to the controller is shown in FIG. 3. The ATM switch 16 generally comprises an N×N switching matrix or fabric 42 at its core coupled to a plurality of N input ports 40 labeled input port #1 through input port #N and to a plurality N of output ports 44 labeled output port #1 through output port #N. Each input port is coupled to an input data source 52 and each output port generates an output data stream 54. Each output port 44 has associated with it a signaling Tx queue 46. The signaling Tx queue functions to store signaling PDUs that cannot momentarily be transmitted due to the sliding window mechanism (i.e., the outstanding signaling PDUs). In addition, a controller 50, coupled to a memory 48, functions to configure and control the operation of the switch matrix 42, input ports 40, output ports 44 and Tx queues 46.

A portion of the memory 48 is designated for use as a centralized buffer space or buffer pool for signaling messages (PDUs) and is of size M. As described previously, this memory is limited in size and in the absence of the method of the present invention would eventually be depleted in the event of signaling congestion. When signaling messages cannot be immediately transmitted by the output port, they are placed in the signaling Tx queue. The signaling Tx queue is comprised of buffers from the memory pool. If the port remains in the congestion state, eventually the available buffer space in the memory pool is depleted and messages begin to be dropped. This causes 'broken' connections that the typical switch cannot recover from.

Figure 4:
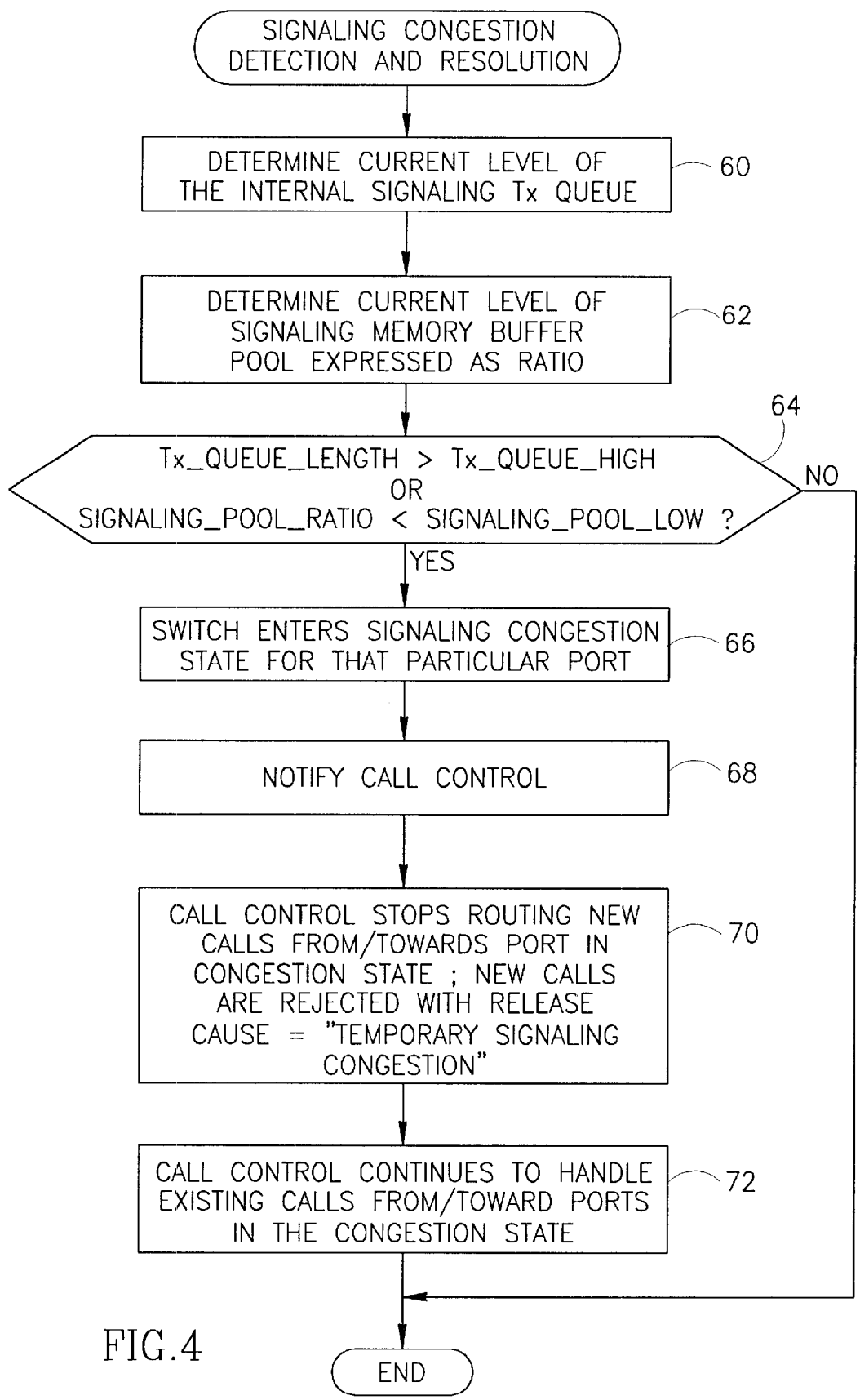
FIG. 4 is a flow diagram illustrating the signaling congestion detection and resolution method portion of the present invention.

To prevent broken connections from occurring, the present invention provides a method of detecting and recovering from signaling congestion conditions. A flow diagram illustrating the signaling congestion detection and resolution method portion of the present invention is shown in FIG. 4. The first step is to determine the current level of the internal signaling Tx queue (step 60). The level of the Tx queue is designated Tx_queue_length and is expressed in absolute length terms, e.g., number of messages or other suitable metric. A larger number indicates a larger number of messages in the queue.

In addition, the level of the signaling memory buffer pool is also determined and expressed as a ratio (step 62). This level is designated signaling_pool_ratio and denotes the available buffer space for signaling message storage expressed as a percentage. Thus, a low ratio indicates less available free buffer space for signaling message storage.

The Tx queue length is then compared with an upper queue threshold and the signaling pool ratio is compared with a lower pool threshold in accordance with the following expression. (step 64).

$$\text{Tx\_queue\_length} > \text{Tx\_queue\_high OR signaling\_pool\_ratio} < \text{signaling\_pool\_low} \quad (1)$$

If this condition is met, the signaling congestion state is declared for that particular port (step 66). Entering this state may be effectuated by the setting of a congestion indication flag in the switch, for example. It is important to note that the detection of signaling congestion is based on either the level of the individual Tx queue associated with each port or the level of the memory buffer pool that is shared by all the ports. Thus, even though a particular queue may not be as loaded as much as other queues, congestion may still be declared if the ratio of available memory pool buffer space is sufficiently low.

For example, the worst case scenario for an egress port in a switch having N input and output ports is for N−1 input ports sending traffic to a single output port. This case is likely to lead to a congestion state. Other, less loaded output ports, however may only have 3 or 4 input ports, for example, sending traffic to them. In this case, although the number of ports sending traffic is low, if the ratio of available buffers in the memory buffer pool is sufficiently low, the congestion state will also be declared in this case too. This is due to the consideration of the combined effect of the level of the queues in other output ports as well.

The determination of the thresholds used to determine whether a port is in the signaling congestion state is based on the size of the signaling sliding window and the number of ports within the communication device (e.g., switch). Note that most switches utilize sliding windows having a length ranging from 4 to 64 messages, e.g., 16 messages. Both the threshold for Tx queue length and the threshold for the ratio of free memory buffer space for signaling messages comprise two thresholds, an upper and lower threshold. This provides hysteresis such as commonly used in amplifier and comparator circuits to prevent oscillations of the output. The present invention utilizes software based hysteresis that functions to prevent rapid changes in the setting and clearing of the signaling congestion state.

The upper threshold for the level of the Tx queue is determined using the size of the sliding window used in the transmission of messages from the output port and the number of ports in the switch and is expressed as the following:

$$(N-1) \cdot \text{Window\_size} \qquad (2)$$

Where window size represents the absolute number of messages or other metric to describe the size of the window used in the sliding window transmission scheme. The expression above represents a threshold suitable for a burst of signaling traffic from N−1 ingress ports to a single egress port.

The lower threshold for the level of the Tx queue is also determined using the size of the sliding window used in the transmission of messages from the output port and the number of ports in the switch and is expressed as the following:

$$\left(\frac{N-1}{2}\right) \cdot \text{Window\_size} \qquad (3)$$

This expression above represents a reasonable choice for the lower threshold since the goal of the method of the present invention is to prevent the occurrence of broken calls and to interfere the least possible with the operation of the switch. Experimentation and tests performed by the inventors indicate that the empirically derived expression for the lower threshold is reasonable and does not effect in any significant way the speed of the switch and the traffic through the connections formed therethrough. In other words, taking the entire call connection process into account, the method of the present invention does not materially effect the speed of operation of the switch and its associated connections.

The lower and upper thresholds for the ratio of the memory pool have also been determined by experimentation. The following thresholds have been found to yield optimum results given the switches and network components used in the tuning experiments.

signaling_pool_low threshold: 15%
signaling_pool_high threshold: 25%

Note that these numbers are provided as an example only. Thresholds higher or lower than these may be used depending on the particular implementation of the switch and associated network components. The threshold percentages express the percentage of free space available for use in storing signaling messages.

With reference to FIG. 4, when the level of the Tx queue exceeds the upper Tx queue threshold or the signaling pool ratio drops below the signaling pool low threshold, i.e., 15%, then the signaling congestion state is declared for that particular port. Due to hysteresis, no oscillations occur as noise causes the level of the Tx queue and the ratio of the memory buffer pool to go above and below the corresponding thresholds.

Once the signaling congestion state is declared (step 66), the call control entity in the switch is notified (step 68). The notification can be carried out using any suitable mechanism such as setting a flag with periodic monitoring by the call control entity via a function call, explicit message passing (typically the slower method). In operation, the signaling layer notifies the call control for each egress port that enters or goes out of the signaling congestion state.

When a port enters the signaling congestion state, the call control ceases to route new calls from and towards this port (step 70). This continues until the port goes out of the signaling congestion state. The call control continues to handle already existing calls from and towards ports in the congestion state (step 72).

In the event the call control cannot find an alternative route for the call, e.g., multiple ports used in a load sharing arrangement, the call is rejected using a unique RELEASE CAUSE. The release cause chosen functions to notify the rest of the network that the new call was rejected due to the particular port temporarily being in the signaling congestion state. During the time the port is in the signaling congestion state all signaling PDUs related to an already existing call are handled normally, i.e., as if the port was not in the congestion state.

Figure 5:
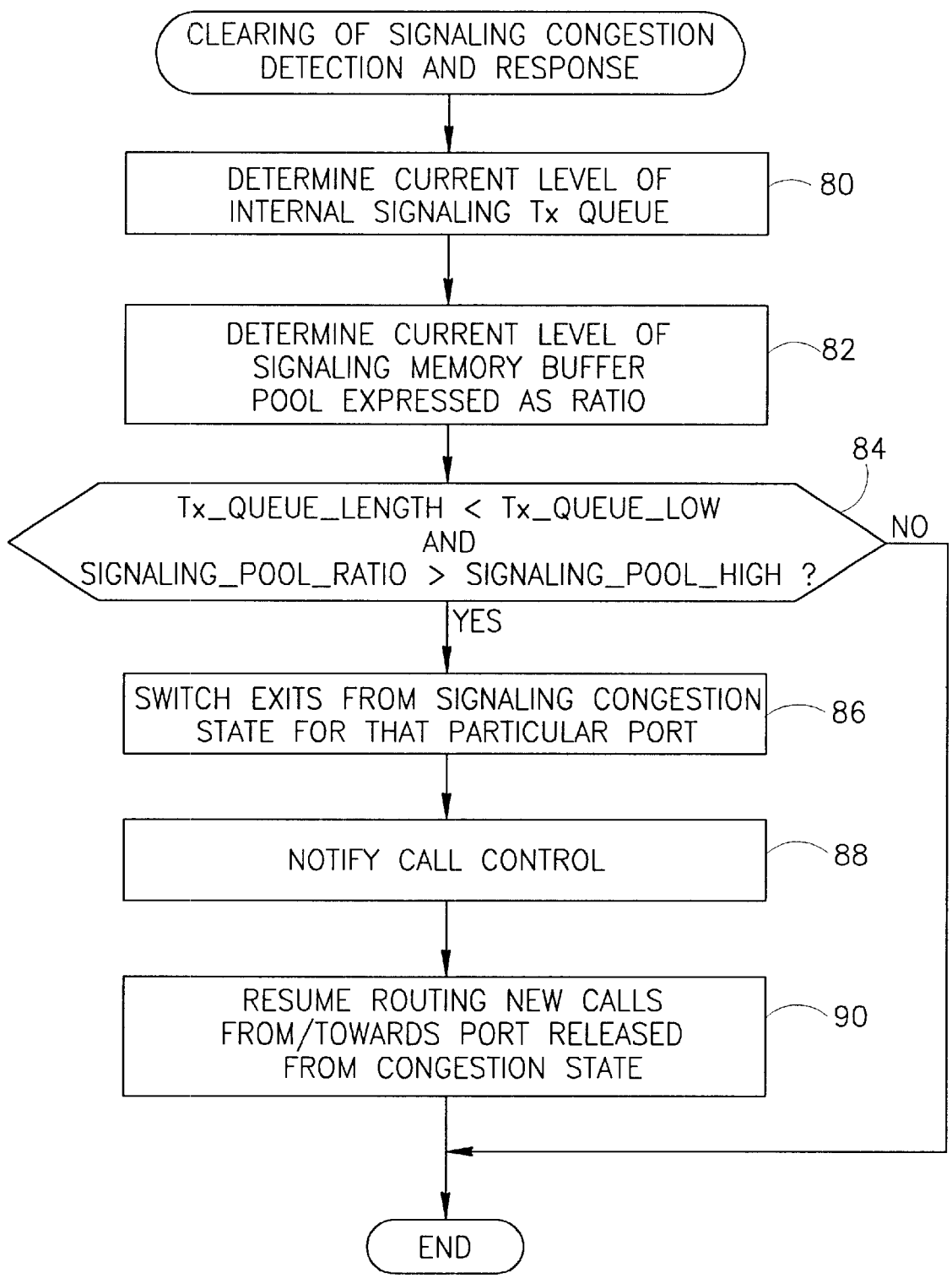
FIG. 5 is a flow diagram illustrating the method of the present invention of detecting and responding to the clearing of the signaling congestion state.

The method of detecting the removal of a congestion state for a port will now be described in more detail. A flow diagram illustrating the method of the present invention of detecting and responding to the clearing of the signaling congestion state is shown in FIG. 5. The method of detecting the removal of a port from the congestion state is similar to that of detecting the entry of a port into the congestion state. First, the current level of the internal signaling Tx queue is determined (step 80) followed by the determination of the current level of the signaling memory buffer pool expressed as a ratio (step 82).

The Tx queue length is then compared with a lower Tx queue threshold and the signaling pool ratio is compared with an upper pool threshold in accordance with the following expression (step 84):

Tx_queue_length<Tx_queue_low AND signaling_pool_ratio>signaling_pool_high (4)

If this condition is met, the particular port is taken out of the signaling congestion state (step 86). Exiting form the congestion state may be effectuated by the clearing of a congestion indication flag in the switch, for example. It is important to note that the clearing of signaling congestion is based on not only the level of the individual Tx queue associated with each port, but also depends on the level of the memory buffer pool that is shared by all the ports. Thus, even though a particular queue may not be as loaded as it was, i.e., its queue length drops, it may still be considered to be congested if the ratio of available memory pool buffer space remains sufficiently low.

Once the switch exits from the signaling congestion state for a port, it notifies the call control via any suitable means such as clearing a flag, sending a message (step 88). From that point onward, the call control entity resumes routing new calls from/towards the port released from the congestion state.

As described previously, the hysteresis prevents oscillations into and out of the signaling congestion state. The buffer pool hysteresis in the example provided herein equals 10%, meaning a port will not exit the congestion state unless the ratio of available signaling buffer memory increases by at least 10%. Note that the actual number of message buffers required is dependent on the size of the memory pool, e.g., 2, 5, 10 MB.

Note also that the time is takes a port in a congestion state to get to non-congestion state depends on the level of signaling traffic directed towards or from the particular port and also depends on (1) the particular values used for the upper and lower thresholds for the Tx queue length, (2) the memory buffer pool ratio and (3) the throughput of the switch controller.

While the invention has been described with respect to a limited number of embodiments, it will be appreciated that many variations, modifications and other applications of the invention may be made.

What is claimed is:

1. A congestion control method for use in a communications device having a plurality of output ports and a memory buffer shared by said plurality of output ports, each output port having a signaling transmit queue associated therewith, said method comprising the steps of:

monitoring the current length of said signaling transmit queue;

monitoring the current ratio of free buffer space available in said memory buffer pool;

declaring an output port to be in the congestion state upon the length of said signaling transmit queue exceeding a first threshold or upon the ratio of available memory buffer pool space dropping below a second threshold;

ceasing to route new calls from and towards an output port that is in a congestion state; and taking a output port of the congestion state when said signaling transmit queue length drops below a third threshold and said ratio of available buffer space in said memory buffer pool exceeds a fourth threshold.

2. The method according to claim 1, further comprising the step of continuing to handle already existing calls from and towards output port in a congestion state.

3. The method according to claim 1, wherein said first threshold comprises an upper transmit queue threshold forming part of a hysteresis mechanism for preventing oscillation into and out of the congestion state.

4. The method according to claim 1, wherein said first threshold comprises an upper transmit queue threshold equal to (N−1)·window_size, wherein N is the number of ports on said communications device and window_size is the size of a sliding window mechanism used in transmitting data from said output port.

5. The method according to claim 1, wherein said second threshold comprises a lower memory buffer pool threshold forming part of a hysteresis mechanism for preventing oscillation into and out of the congestion state.

6. The method according to claim 1, wherein said second threshold comprises a lower memory buffer pool threshold equal to 15%.

7. The method according to claim 1, wherein said third threshold comprises a lower transmit queue threshold forming part of a hysteresis mechanism for preventing oscillation into and out of the congestion state.

8. The method according to claim 1, wherein said third threshold comprises a lower transmit queue threshold equal to $$\left(\frac{N-1}{2}\right) \cdot \text{window\_size},$$

wherein N is the number of ports on said communications device and window_size is the size of a sliding window mechanism used in transmitting data from said output port.

9. The method according to claim 1, wherein said fourth threshold comprises an upper memory buffer pool threshold forming part of a hysteresis mechanism for preventing oscillation into and out of the congestion state.

10. The method according to claim 1, wherein said fourth threshold comprises an upper memory buffer pool threshold equal to 25%.

11. The method according to claim 1, further comprising the steps of:

attempting to route a new call to an output port not in the congestion state; and rejecting a call which cannot be routed to an alternative output port not in the congestion state utilizing a unique RELEASE CAUSE operative to notify the rest of the network that said call was rejected due to a temporary congestion state on said output port.

12. An apparatus for detecting a congestion state for use in a communications device, said communications device, said apparatus comprising:

one or more transmitters each having an output port and a signaling transmit queue associated therewith;

a memory buffer pool shared by a plurality of output ports;

one or more signaling entities operative to establish, terminate and maintain one or more Switched Virtual Channel Connections (SVCCs);

a call control entity for configuring, administering and controlling said one or more signaling entities;

software means operative on said one or more signaling entities and said call control entity for:

monitoring the current length of each signaling transmit queue;

monitoring the current ratio of free buffer space available in said memory buffer pool;

declaring an output port to be in the congestion state upon the length of said signaling transmit queue exceeding a first threshold or upon the ratio of available memory buffer pool space dropping below a second threshold;

ceasing to route new calls from and towards an output port that is in a congestion state; and taking an output port out of the congestion state when said signaling transmit queue length drops below a third threshold and said ratio of available buffer space in said memory buffer pool exceeds a fourth threshold.

13. The apparatus according to claim 12, wherein said software means is operative to continue to handle already existing calls from and towards output port in a congestion state.

14. The apparatus according to claim 12, wherein said first threshold comprises an upper transmit queue threshold forming part of a hysteresis mechanism for preventing oscillation into and out of the congestion state.

15. The apparatus according to claim 12, wherein said first threshold comprises an upper transmit queue threshold equal to (N−1)·window_size, wherein N is the number of ports on said communications device and window_size is the size of a sliding window mechanism used in transmitting data from said output port.

16. The apparatus according to claim 12, wherein said second threshold comprises a lower memory buffer pool threshold forming part of a hysteresis mechanism for preventing oscillation into and out of the congestion state.

17. The apparatus according to claim 12, wherein said second threshold comprises a lower memory buffer pool threshold equal to 15%.

18. The apparatus according to claim 12, wherein said third threshold comprises a lower transmit queue threshold forming part of a hysteresis mechanism for preventing oscillation into and out of the congestion state.

19. The apparatus according to claim 12, wherein said third threshold comprises a lower transmit queue threshold equal to $$\left(\frac{N-1}{2}\right) \cdot \text{window\_size},$$

wherein N is the number of ports on said communications device and window_size is the size of a sliding window mechanism used in transmitting data from said output port.

20. The apparatus according to claim 12, wherein said fourth threshold comprises an upper memory buffer pool threshold forming part of a hysteresis mechanism for preventing oscillation into and out of the congestion state.

21. The apparatus according to claim 12, wherein said fourth threshold comprises an upper memory buffer pool threshold equal to 25%.

22. The apparatus according to claim 12, wherein said software means is operative to:
  attempt to route a new call to an output port not in the congestion state; and
  reject a call which cannot be routed to an alternative output port not in the congestion state utilizing a unique RELEASE CAUSE operative to notify the rest of the network that said call was rejected due to a temporary congestion state on said output port.

* * * * *